United States Patent [19]

Bauer

[11] Patent Number: 4,901,356

[45] Date of Patent: Feb. 13, 1990

[54] VOICE TRANSMISSION SYSTEM

[75] Inventor: Alfred Bauer, Parma, Ohio

[73] Assignee: Actron Manufacturing Company, Cleveland, Ohio

[21] Appl. No.: 134,934

[22] Filed: Dec. 18, 1987

[51] Int. Cl.⁴ .......................... H04R 1/08; H04M 1/05

[52] U.S. Cl. .......................... 381/169; 381/187

[58] Field of Search ............... 381/169, 168, 183, 187, 381/75; 181/21, 22; 379/430; 2/422

[56] References Cited

U.S. PATENT DOCUMENTS

| | | | |
|---|---|---|---|
| 1,139,177 | 5/1915 | Ganzer | 379/430 |
| 1,242,672 | 10/1917 | Finley | 379/430 |
| 1,344,349 | 6/1920 | Mickelson | 379/430 |
| 1,656,914 | 1/1928 | Hart | 181/22 |
| 2,942,072 | 6/1960 | Cunningham | 379/430 |
| 2,950,360 | 8/1960 | Duncan | 381/187 |
| 2,953,129 | 9/1960 | Bloom | 128/201.19 |
| 3,180,333 | 4/1965 | Lewis | 381/183 |
| 3,243,511 | 3/1966 | Erdman et al. | 381/75 |
| 3,314,424 | 4/1967 | Berman | 381/187 |
| 4,072,831 | 2/1978 | Joscelyn | 381/187 |
| 4,237,341 | 12/1980 | Richards | 381/75 |
| 4,374,301 | 2/1983 | Frieder, Jr. | 379/430 |
| 4,400,591 | 8/1983 | Jennings et al. | 381/187 |
| 4,471,174 | 9/1984 | Nava | 379/430 |
| 4,508,936 | 4/1985 | Ingalls | 381/79 |
| 4,683,588 | 7/1987 | Goldberg | 379/430 |

FOREIGN PATENT DOCUMENTS

| | | | |
|---|---|---|---|
| 549518 | 11/1942 | United Kingdom | 381/187 |
| 2165721 | 4/1986 | United Kingdom | 381/187 |

*Primary Examiner*—Jin F. NG
*Assistant Examiner*—Danita R. Byrd
*Attorney, Agent, or Firm*—Calfee, Halter & Griswold

[57] ABSTRACT

A voice transmission system for a face mask includes a microphone assembly partially received in and threadedly connected to an emitter passage through the mask to position a microphone on the inside of the mask. An amplifier assembly is threaded onto the outer end of the microphone assembly until spring loaded electrical contactors on the amplifier assembly resiliently engage circumferentially continuous contacts on the microphone assembly to complete an electrical circuit between the microphone and the amplifier assembly.

8 Claims, 5 Drawing Sheets

VOICE TRANSMISSION SYSTEM

FIELD OF THE INVENTION

The present invention relates to voice transmission or communication systems for gas masks in general and to a microphone assembly threadedly connected to the emitter passage and an amplifier assembly threadedly connected to the microphone assembly in particular.

BACKGROUND OF THE INVENTION

Protective gas masks for the human face are well known. People wearing the gas masks often have a need to communicate with one another, particularly in emergency situations. Several communication systems have been developed for this purpose.

For example, Berman U.S. Pat. No. 3,314,424 includes a microphone inside the mask and an amplifier assembly outside the mask, with an electrical cable extending therebetween and passing through a sealed grommet in the mask. Erdman, et al. U.S. Pat. No. 3,243,511, assigned to the same company as the Berman patent, showing substantially the same mask as the Berman patent with the amplifier circuit being disclosed.

Lewis U.S. Pat. No. 3,180,333 discloses a gas mask communication system including a generally U-shaped holder connected to the mask. Preferably, the holder includes the amplification speaker in one end portion thereof and the batteries for operating the speaker system in the other end portion thereof. The batteries and amplification system are connected in circuit with a microphone inside the mask adjacent the user's mouth. Additional or parallel speakers can be plugged into the Lewis mask communication system including, for example, a speaker attached to the belt of the wearer.

Ingels U.S. Pat. No. 4,508,936, Bloom U.S. Pat. No. 2,953,129 and Duncan U.S. Pat. No. 2,950,360 disclose face mask communication systems having a microphone carried in the face mask and an amplifier or speaker externally coupled to the face mask for support elsewhere, such as around the waist of the user. These voice communication systems for masks have several disadvantages. First, the attachment of the amplifier or speaker to the waist adds weight and bulk to the unit and partially limits the mobility of the wearer. Second, the person wearing the mask often turns his head during an emergency situation to talk, but the amplifier or speaker on his waist does not simultaneously turn since his body does not turn. Thus, the wearer is attempting to project his voice in one direction but the voice is actually being transmitted in a different direction. By having the face and amplifier or speaker potentially as much as 90° apart in direction, the efficiency and effectiveness of the voice transmission and projection is diminished.

SUMMARY OF THE INVENTION

The principal object of the present invention is to have a microphone assembly and amplifier assembly that are readily connected to the existing emitter passage and to one another. To this end, the emitter passage has a female threaded section adjacent its end normally to house a voice emitter diaphragm held in place by a perforated cover. With the present invention, the voice emitter diaphragm and cover can be readily removed, the microphone assembly can be screwed into the female section of the emitter passage and the amplifier assembly can be screwed into the microphone assembly.

Another object of the present invention is to provide a compact and lightweight voice transmission system that follows the head of the mask user. The microphone assembly and amplifier assembly of the present invention employ relatively small, plastic bodies reducing the weight and enhancing the compactness of the system. By threadedly coupling the microphone assembly and amplifier assembly to the emitter passage, the lightweight and compact voice transmission and amplification system of the present invention follows the head of the user to project the person's voice in the direction his face is pointing.

Yet another object of the present invention is to provide a positive resilient electrical contact between the amplifier assembly and the microphone assembly during installation. The microphone assembly is provided with two spaced circular contacts on the end thereof. These circular contacts are engaged by spring loaded pins or ball contacts carried by the amplifier assembly. The spring loaded pins or ball contacts are normally urged to a position guaranteeing positive engagement with the contacts when the amplifier assembly is fully threaded onto the microphone assembly.

These and other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

DETAILED DESCRIPTION OF THE DRAWINGS

DETAILED DESCRIPTION OF THE PREFERRED EMBODIMENT

Figure 1:
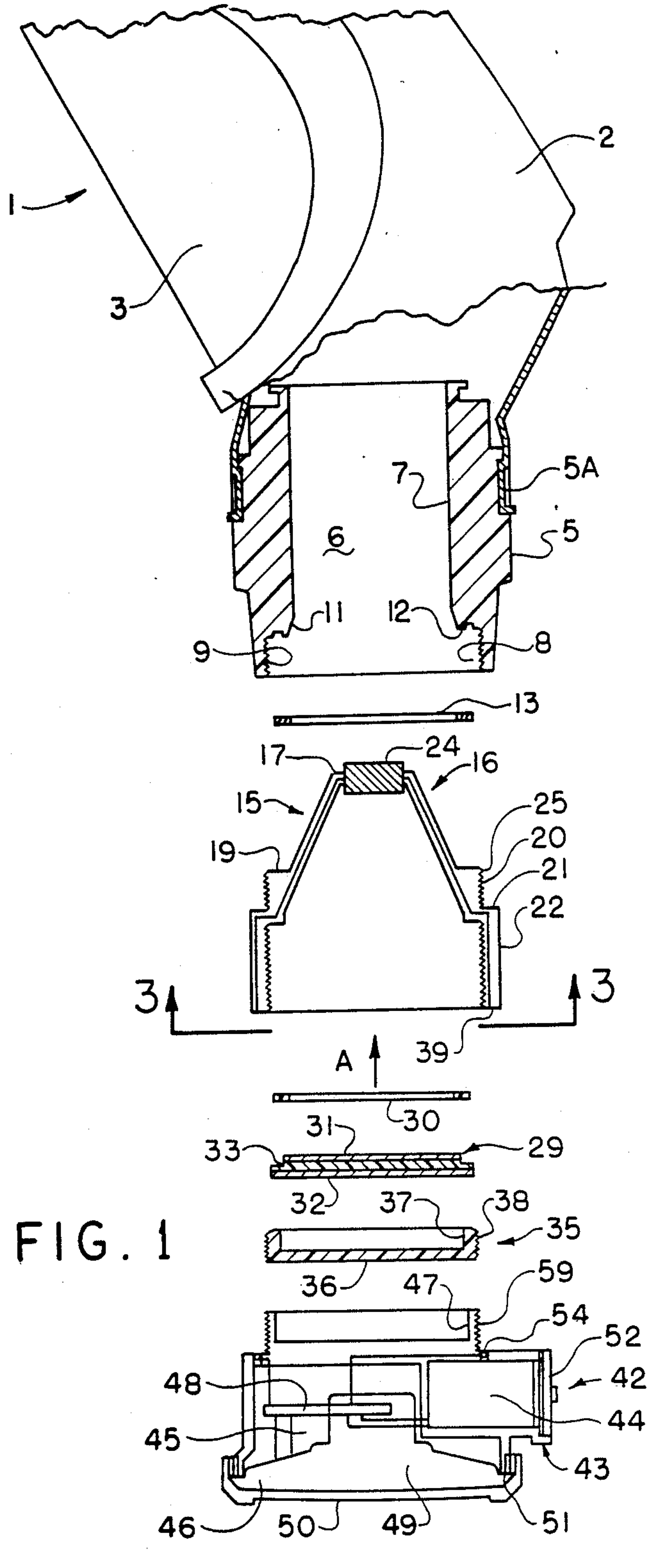
FIG. 1 is an exploded view of the components of the voice transmission system of the present invention prior to assembly or installation on the gas mask.
Figure 2:
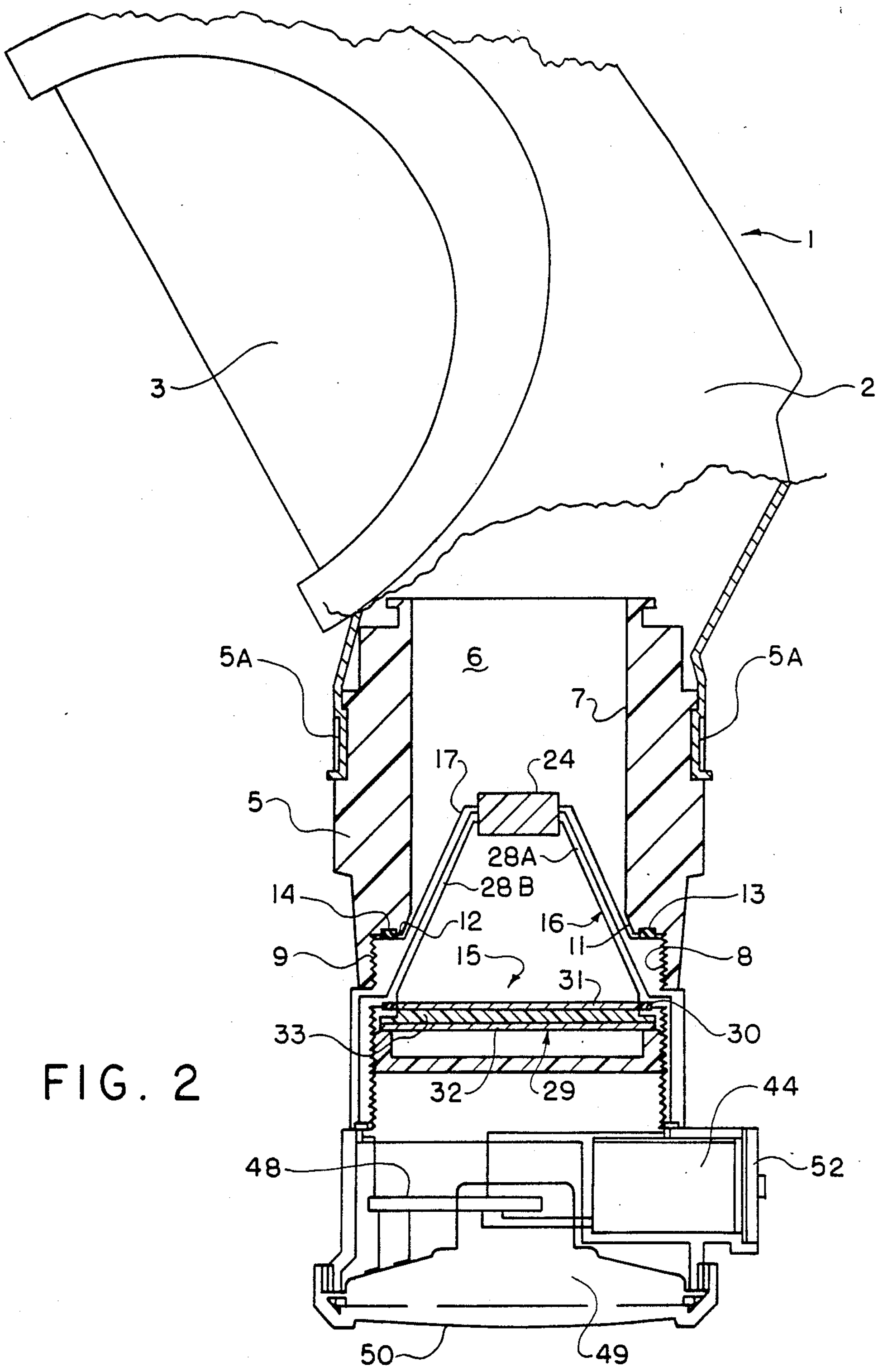
FIG. 2 is a vertical elevation partially in section showing the microphone assembly and amplifier assembly of the present invention installed on the emitter passage of a gas mask used to protect the face of a person, such as a fire fighter.
Figure 6:
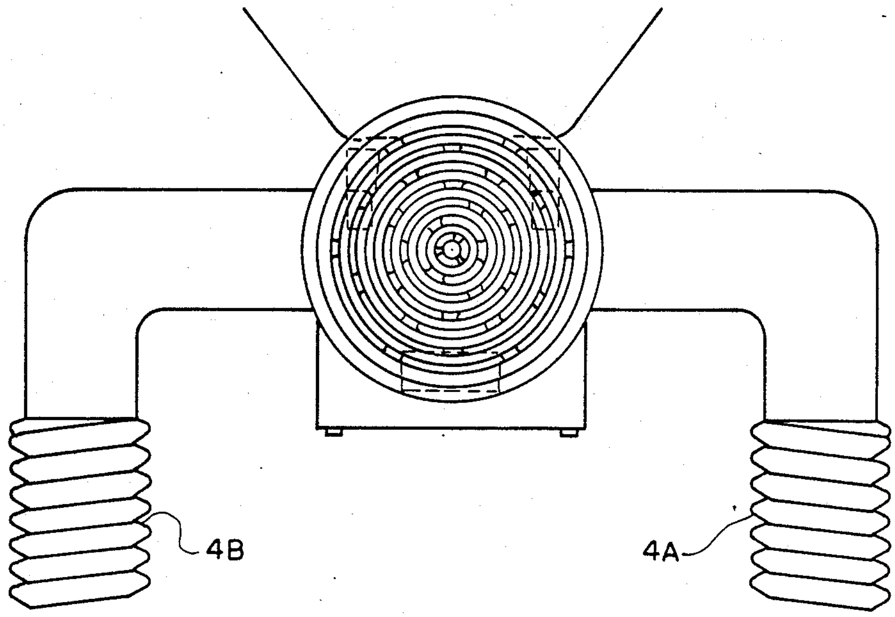
FIG. 6 is a front view of part of the mask and the voice transmission system of the present invention.

Turning now in more detail to the drawings and initially to FIGS. 1 and 2, a gas mask, indicated generally at 1, includes a face piece 2 held tightly against the head of the user by straps encircling the back of the head. A transparent viewing plate 3 is mounted in and sealingly secured to the face piece 2. A person wearing the mask 1 on inhaling receives filtered air drawn through a conventional inhalation tube 4A and on exhaling exhausts air through a conventional exhalation tube 4B. The inhalation and exhalation tubes have check valves and filters mounted therein to preclude noxious gases or contaminants entrained in the air from entering the inside of face plate 2 and transparent face plate 3.

A person wearing the face mask often needs to communicate with other people in the area. For this purpose, a conventional plastic voice emitter body 5 is secured to the mask 1 by a clamp 5A received in an external groove on body 5. The emitter body 5 has a stepped emitter passage 6 extending therethrough and being formed by bore 7 and counterbore 8. The counterbore 8 has female threads 9 thereon which normally mate with threads on the perforated cover retaining a voice emitter diaphragm in the emitter passage. A chamfered relief 11 and shoulder 12 are formed between the bore 7 and counterbore 8. A circular flat rubber seal 13 is mounted in an annular groove 14 provided in shoulder 12.

A microphone assembly indicated generally at 15 is partially received in and threadedly mounted to the emitter passage. The microphone assembly includes a lightweight plastic body 16 having an inner end face 17, two diametrically opposed, angled spokes 18, a first radially projecting annular shoulder 19, a first axially extending annular wall 20, a second radially projecting annular shoulder 21 and a second enlarged diameter axially extending wall 22.

The inner end wall 17 has a microphone cartridge 24 mounted therein. This microphone cartridge is sold by Cord Electronics, Inc. under part number U62B.

The radially outer surface of the first axial wall 20 of microphone assembly body 16 has male threads 25 thereon. The microphone assembly body 16 is screwed into the emitter passage 6 with threads 25 mating with threads 9 on counterbore 8. Body 16 is threadedly advanced into the emitter passage until the inner end of first annular shoulder 19 bottoms out on and compresses circular flat rubber seal 13. The microphone assembly body is then properly positioned in and sealed to the emitter body 5 to preclude outside air from entering mask 1. The radially inner surface of the second axial wall 22 of the microphone assembly body 16 has female threads 26. Electrical leads 28A and 28B are connected at their inner respective ends to opposite sides of microphone cartridge 24 and extend through and are embeded in the microphone assembly body 16 to the forward end wall thereof as will be described in more detail below.

A voice emitter diaphragm 29 is mounted in the microphone assembly 15 in a position inside second axially extending wall 22 against or immediately adjacent the inner side of second shoulder 21. A circular flat rubber seal 30 is mounted on the internal side of shoulder 21, with the voice emitter diaphragm engaging the circular flat rubber seal to provide air tight sealing contact therebetween. The voice emitter diaphragm includes parallel plates 31 and 32 having a layer of mylar 33 sandwiched therebetween. The voice emitter diaphragm blocks noxious or contaminated air from entering the microphone assembly while being capable of transmitting some sound therethrough.

The voice emitter diaphragm 29 is held in position by a dish lock ring indicated generally at 35, having a base wall 36 and an annular side wall 37. The radially outer surface of sidewall 37 is threaded as indicated at 38. The dish shaped lock ring 35 is threaded down the female threads 26 on second axial wall 22 of the microphone assembly body. Lock ring 35 bears against plate 32 of the voice emitter diaphragm 29 to hold the same against circular flat rubber seal 30.

Figure 3:
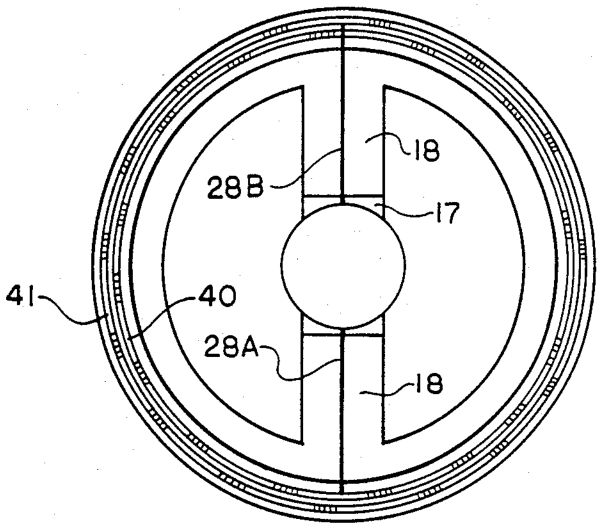
FIG. 3 is an enlarged end view of the plastic body of the microphone assembly as taken on the plane 3—3 of FIG. 1 showing the concentric circular contacts carried by the outer end of that body.
Figure 4:
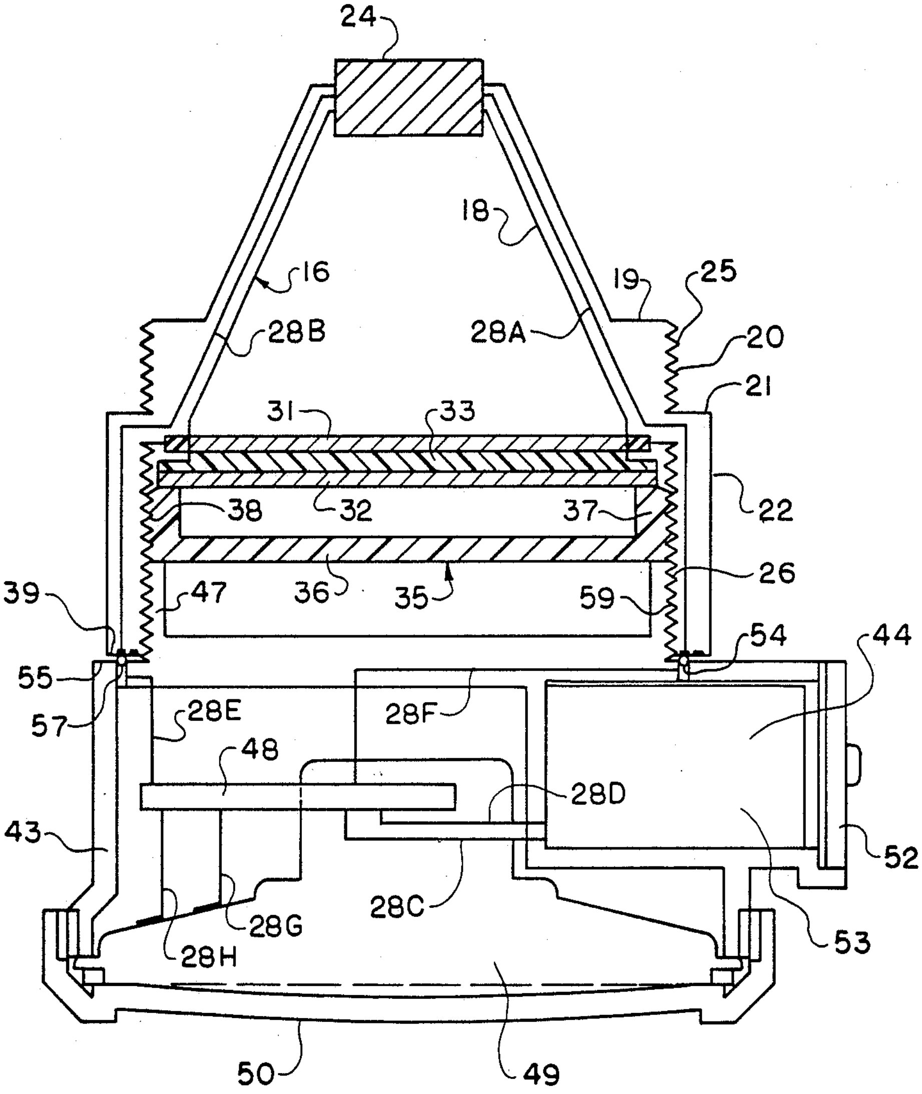
FIG. 4 is an enlarged section of the microphone assembly and amplifier assembly as installed with the electrical circuit and end contacts being schematically illustrated.
Figure 5:
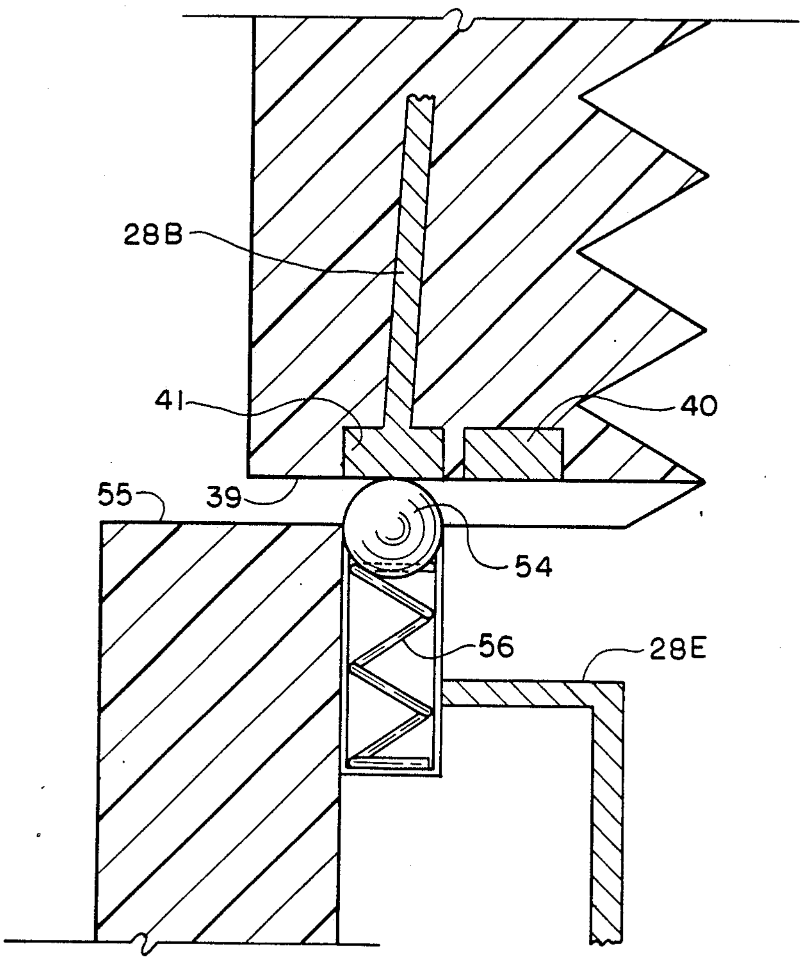
FIG. 5 is an enlarged view of the spring load contactor ball carried by the amplifier assembly just prior to making engagement with the contact on the end of the microphone assembly body.

The end face 39 of microphone assembly body 16 has two spaced circular electrical contacts 40 and 41. These concentric circular contacts 40 and 41 are respectively connected to leads 28A and 28B in body 16 as best shown in FIG. 3. Spaced circular contacts 40 and 41 are adapted to provide an electrical connection with the amplifier assembly, indicated generally at 42.

The amplifier assembly 42 includes a lightweight, preferably integrally molded, plastic body 43 having a battery compartment 44, an open forward end 46 and an inner sleeve 47. An amplifier board 48 and speaker 49 are mounted in main compartment 45 of body 43. The amplifier 48 may be purchased from SGS Semiconductor under part number TDA1904, and the speaker 49 may be purchased from Cord Electronics, Inc. under part number 70 RPOSN-4. A perforated speaker cover 50 is threaded onto body 44 as indicated at 51 to cover the outer end of the speaker 49 and the open end 46 of body 44.

The battery compartment 44 has a selectively removable cover 52. When the cover is off, a 9 V battery 53 may be positioned in the battery compartment 44 to provide a source of power for the voice transmission system of the present invention. Leads 28C and 28D extend from the battery terminals to the amplifier board 48. Lead 28E extends from the amplifier board to a metallic contactor ball 54 positioned on a base wall 55 of amplifier assembly body 43. The contactor ball 54 is spring biased as indicated at 56 normally resiliently to urge the ball 54 forwardly. Instead of the ball illustrated, it will be appreciated that a metallic pin could be used as the contactor. A second spring loaded contactor ball 57 is mounted on base wall 55 in a position generally diametrically opposite ball 54. Spring loaded balls 54 and 57 are adapted respectively positively to engage circular contacts 41 and 40 on the microphone assembly when the amplifier assembly is screwed onto the microphone assembly.

To this end, the radially outer surface of sleeve 47 has male threads 59 thereon. Male threads 59 mate with female threads 26 internally positioned on the second axially extending wall 22 of the microphone assembly body 16. The amplifier assembly is threadedly advanced into the microphone assembly until the inner end of sleeve 47 bottoms out against base wall 36 of lock ring 35. In such position, the base wall 55 of body 43 also abuts the end face 39 of microphone assembly body 16. Since the balls 54 and 57 normally extend forwardly of base wall 55, the balls 54 and 57 will be depressed against their respective contacts to insure a positive electrical contact.

Spring loaded ball 57 has electrical lead 28F extending through body 43 to a connection with amplifier board 48. Electrical leads 28G and 28H extend from the amplifier board to the speaker 49. Leads 28A through 28H thus provide a closed electrical circuit between the battery 53, the amplifier board 48, the microphone cartridge 24, and the speaker 49 when the amplifier assembly is fully threaded onto the microphone assembly providing an electrical connection therebetween. The electrical circuit schematically disclosed herein includes additional capacitors and resistors (not shown). This circuit is basically conventional and does not form part of this invention except for the means of making electrical contact between the amplifier assembly and microphone assembly.

As will be appreciated, the microphone cartridge 24 is positioned inside the voice communication system under the mouth of the user while the speaker 48 is positioned within the voice communication system but pointed outwardly in a direction away from the mask. The microphone assembly and amplifier assembly can be readily operably connected by completing two threaded connections. If the amplifier assembly malfunctions for any reason, the masked user can quickly disassemble the amplifier assembly by unthreading the same from the microphone assembly. By doing this, the user's voice can then be transmitted through the diaphragm assembly 29.

It will be apparent from the foregoing that changes may be made in the details of construction and configuration without departing from the spirit of the invention as defined in the following claims.

I claim:

1. A voice transmission system for a protective face mask having a voice emitter passage with its inner end positioned proximate a person's mouth wearing the mask, the improvement comprising:

(a) a microphone assembly at least partially received in and sealed to the emitter passage, the microphone assembly including (1) a first housing, (2) a microphone mounted on the first housing, (3) outwardly facing contact means carried by the first housing and (4) first electrical leads extending from the contact means to the microphone; and (b) an amplifier assembly secured to an outer end of the microphone assembly, the amplifier assembly including (1) a second housing having a generally open forward end and carrying a portable power source, (2) an amplifier board mounted in the second housing, (3) a speaker mounted in the second housing adjacent its open end, (4) contactor means carried by the second housing to engage the contact means on the first housing to form an electrical connection therebetween, and (5) second electrical leads interconnecting the power source with the contact means, amplifier board and speaker to complete an electrical circuit between the power source, microphone, amplifier board and speaker to transmit and amplify the wearer's voice when the microphone assembly and amplifier assembly are fully installed onto the emitter passage, said contactor means including two spring loaded contactors respectively resiliently engaging two radially spaced, circumferentially continuous contacts on the first housing.

2. The voice transmission system of claim 1 wherein the amplifier assembly has a male threaded section thereon screwed into mating female threads in the microphone assembly, the amplifier assembly being threadedly advanced until an end of the male threaded section engages a stop provided in the microphone assembly.

3. The voice transmission system of claim 2 wherein the spring loaded contactors are depressed on installation of the amplifier assembly to insure proper electrical contact between the contactors and contacts when the amplifier assembly is fully installed.

4. The voice transmission system of claim 3 further including a diaphragm membrane positioned in the microphone assembly to seal the user from outside air while being capable of transmitting some sound if the amplifier assembly is removed.

5. The voice transmission system of claim 3 wherein the microphone assembly is threadedly connected to the emitter passage, with a shoulder on the microphone assembly engaging a seal carried in the emitter passage properly to position the microphone assembly and to provide a seal between the microphone assembly and emitter passage.

6. A voice transmission system for a protective face mask having a voice emitter passage with its inner end positioned proximate a person's mouth wearing the mask, the improvement comprising:

(a) a microphone assembly at least partially received in and sealed to the emitter passage, the microphone assembly including (1) a first housing, (2) a microphone mounted on the first housing, (3) outwardly facing contact means carried by the first housing and (4) first electrical leads extending from the contact means to the microphone; and (b) an amplifier assembly removably secured to an outer end of the microphone assembly, the amplifier assembly including (1) a second housing having a generally open forward end and carrying a portable power source, (2) an amplifier board mounted in the second housing, (3) a speaker mounted in the second housing adjacent its open end, (4) contactor means carried by the second housing to engage the contact means on the first housing to form an electrical connection therebetween upon attachment of the amplifier assembly to the microphone assembly, and (5) second electrical leads interconnecting the power source with the contact means, amplifier board and speaker to complete an electrical circuit between the power source, microphone, amplifier board and speaker to transmit and amplify the wearer's voice when the microphone assembly and amplifier assembly are fully installed onto the emitter passage.

7. The voice transmission system of claim 6 wherein the contactor means includes two spring loaded contactors respectively resiliently engaging two radially spaced, circumferentially continuous contacts on the first housing.

8. A voice transmission system for a face mask comprising a voice emitter passage extending from the face mask, a microphone assembly at least partially mounted in the emitter passage and having a microphone positioned near a user's mouth and an amplifier assembly with a portable power source mounted on the microphone assembly and having contactor means thereon engaging contact means on the microphone assembly to complete an electrical circuit between the microphone and the amplifier assembly on the outside of the mask, said microphone assembly being threaded into the emitter passage, the amplifier assembly being threaded onto the microphone assembly and the contactor means being spring loaded into a positive connection with the contact means.

* * * * *